(12) United States Patent
Knobel

(10) Patent No.: US 6,327,969 B1
(45) Date of Patent: Dec. 11, 2001

(54) DEVICE FOR COOLING AND/OR HEATING OBJECTS

(75) Inventor: Josef Knobel, Wigoltingen (CH)

(73) Assignee: KMB Productions AG, Fleben (CH)

( * ) Notice: Subject to any disclaimer, the term of this patent is extended or adjusted under 35 U.S.C. 154(b) by 0 days.

(21) Appl. No.: 09/463,135

(22) PCT Filed: Jul. 21, 1998

(86) PCT No.: PCT/EP98/04571

§ 371 Date: Mar. 20, 2000

§ 102(e) Date: Mar. 20, 2000

(87) PCT Pub. No.: WO99/04643

PCT Pub. Date: Feb. 4, 1999

(30) Foreign Application Priority Data

Jul. 25, 1997 (DE) .............................................. 197 32 037

(51) Int. Cl.[7] .................................................... A23G 7/02
(52) U.S. Cl. .............................. 99/476; 99/478; 99/483; 99/470
(58) Field of Search .............................. 99/476, 477, 478, 99/479, 483, 443 C, 470; 62/63, 381

(56) References Cited

U.S. PATENT DOCUMENTS

| | | | |
|---|---|---|---|
| 2,062,535 | * 12/1936 | Thompson . | |
| 4,023,376 | * 5/1977 | Onodera | .................................. 62/63 |
| 4,078,394 | * 3/1978 | Chamberlain et al. | ............ 62/381 X |
| 4,480,535 | * 11/1984 | Jaxmar et al. | .......................... 99/476 |
| 4,750,416 | * 6/1988 | Graham | .............................. 99/478 X |
| 4,953,365 | * 9/1990 | Lang et al. | .............................. 62/381 |
| 5,398,521 | * 3/1995 | Baron et al. | ........................... 62/381 |

FOREIGN PATENT DOCUMENTS

| | | | |
|---|---|---|---|
| 528593 | * | 2/1993 | (EP) . |
| 578523 | * | 1/1994 | (EP) . |
| 1516498 | * | 1/1968 | (FR) . |

OTHER PUBLICATIONS

WO 91/17400, Nov. 1991, Gyger et al.*

* cited by examiner

Primary Examiner—Reginald L. Alexander
(74) Attorney, Agent, or Firm—Bachman & LaPointe, P.C.

(57) ABSTRACT

A device for cooling and/or heating objects, in particular edible cakes and pastries, has a cylinder into which air is blown and flows out of holes. The cylinder is associated to a spiral conveyor upon which the objects can be carried past their holes.

13 Claims, 7 Drawing Sheets

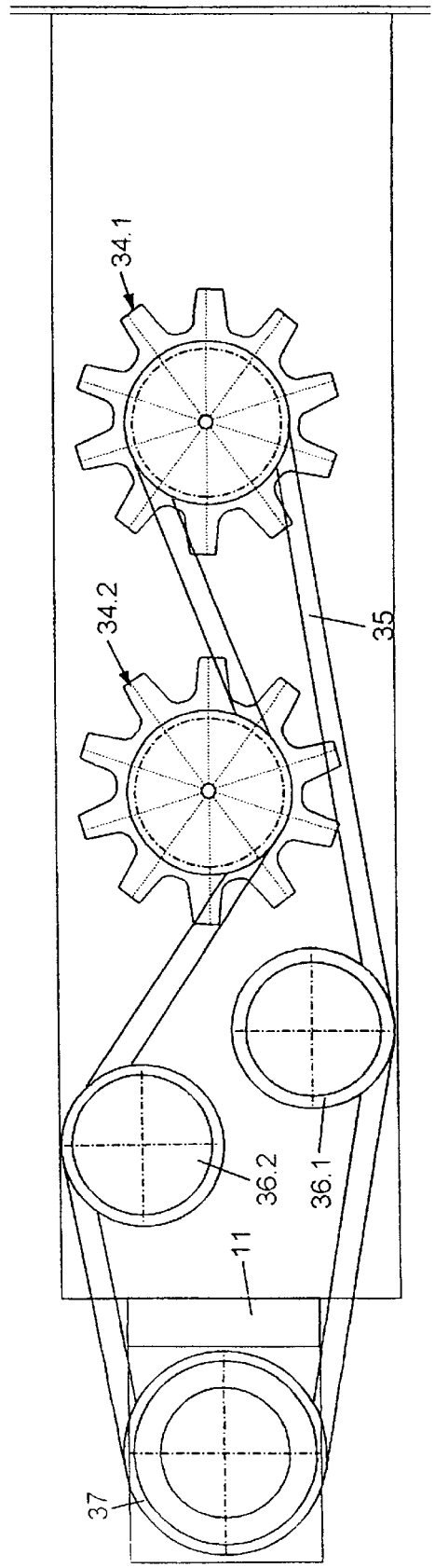

DEVICE FOR COOLING AND/OR HEATING OBJECTS

BACKGROUND OF THE INVENTION

The invention relates to an apparatus for cooling and/or warming articles, in particular edible products in the confectionery sector.

In many industrial sectors, articles are produced which, following manufacture, have to be cooled or heated. For temperature-control processes of this type there are a large number of apparatuses and methods. In the present case, it is primarily edible products from the confectionery sector whose temperature is to be controlled, that is to say, for example, pralines produced by the one-shot process, which consist of a filling surrounded by a chocolate coating. In this case, what is primarily concerned is that the cooling should be carried out as quickly as possible following manufacture and uniformly from all sides, in order that the edible products maintain their shape. Hitherto, only a few suitable apparatuses have been used for this purpose and are also generally of very complicated construction.

It is an object of the present invention to provide an apparatus of the abovementioned type with which the quickest possible temperature control of the articles can be carried out in a simple way, the intention being for the temperature control also to be carried out as far as possible from all sides.

SUMMARY OF THE INVENTION

The foregoing object is achieved by providing an apparatus for cooling and/or heating articles comprising a housing having a conveyor inlet and a conveyor outlet; at least one cylinder disposed in the housing, the at least one cylinder defining an interior chamber and having at one end thereby provided with one of a air heating means and air cooling means at the other end thereof closure means for closing the cylinder; and a conveyor for passing the articles through the housing and around the at least one cylinder from the conveyor inlet to the conveyor outlet, the conveyor being disposed along a helical path around the at least one cylinder wherein the at least one cylinder is provided with air flow springs feeding air from the interior chamber to the articles.

The helical conveyor has the great advantage that it is able to move the products whose temperature is to be controlled continuously past the air openings, so that the articles whose temperature is to be controlled are acted on continuously with cooling or warming air. For this purpose, the obvious thing is for the air openings likewise to be arranged helically in the cylinder, to be specific with a pitch which corresponds approximately to the pitch of the helical conveyor. Added to this is the fact that the air openings are preferably arranged to be offset in relation to one another, so that the products whose temperature is to be controlled are acted on continuously by air, although no continuous slot is formed in the cylinder.

In order to produce the cooling or the heating, a cooling or heating element and an appropriate fan should preferably be arranged directly in the cylinder. Of course, both elements could also be located outside the cylinder but the integration of the two elements into the cylinder permits a significantly more compact construction.

Although quite good temperature control of the edible products is already carried out with the arrangement of one cylinder and the helical conveyor, in a preferred exemplary embodiment of the invention a first cylinder is to be assigned a second cylinder having corresponding air openings described above. In this case, the helical conveyor is arranged in such a way that it wraps around the second cylinder in the opposite direction to the first cylinder. This means that the helical conveyor rises in the first cylinder and falls in the second cylinder.

The significant advantage of the invention resides in the fact that, as a result of reversing the direction of rotation of the helical conveyor, the edible products are acted on by the temperature-control medium from one side in the one cylinder and are acted on from the other side in the other cylinder. The edible products are therefore acted on from all sides with cooling or warming air, so that the temperature control is carried out very uniformly.

An essential part of the helical conveyor is a guide track, on which a chain which is connected to a drive runs. The chain is configured in such a way that the edible products whose temperature is to be controlled rest on it and can be transported by it. Should it prove to be expedient, the chain or individual chain links can be covered with appropriate non-slip material.

In a preferred exemplary embodiment, the chain comprises a large number of wing-like chain links, which are connected to one another by joints. The joints are configured in such a way that it is made possible for the chain to run around a curve. This means, in a simple exemplary embodiment, that the individual chain links are connected to one another via connecting pins which pass through a double tapered hole in a chain link. This double tapered hole allows the chain links mobility on all sides in relation to one another.

In order to save as much height as possible in the individual levels of the helical conveyor, and therefore to be able to construct the entire apparatus with a lower height, it proves to be expedient to arrange the chain with two mutually oppositely rotating horizontal drive gear wheels in each case. These drive gear wheels are arranged, for example, in the guide track itself or pass through the latter and mesh with corresponding bearing points on the chain links, these bearing points preferably having rounded tooth flanks. These bearing points are also assigned guide tabs, which ensure that the drive gear wheels remain meshed with the tooth flanks of the chain links even when running around a curve.

A plurality of drive gear wheel pairs of this type are preferably provided over the height of the helical conveyor, in each case arranged level by level. The drive gear wheels of each level are preferably driven by a common drive belt, a drive chain or the like, which is in turn connected to a drive wheel. The drive wheels on one side of a helical conveyor are connected to one another via a drive rod, which is driven by a single motor drive.

In addition, the chain runs with its chain links in rail sections of a guide track, which in each case comprises a supporting layer and a sliding layer. Since both the chain links and the guide track are preferably composed of plastic, the sliding layer should be matched to the plastic of the chain links in such a way that as few wear phenomena as possible occur and, on the other hand, it is possible for the chain links to slide without difficulty.

For the purpose of guiding the chain links, the guide track has a groove, which is preferably undercut, the joint of the chain link sliding in the undercut. Overall, the groove has a cross section shaped similarly to an inverted T.

In order to be able to compensate for production tolerances, thermal expansion and different pitches, the rail sections are preferably not fixed continuously to a machine frame, but only at one end. At the other end, they engage with a tongue in a recess in a following rail section, so that, for example, as a result allowance can be made for thermal expansion in a simple way.

Overall, the apparatus is extremely suitable for controlling the temperature of articles and satisfies the abovementioned object without difficulty. In particular, it requires very little maintenance and manages with only a few drives.

BRIEF DESCRIPTION OF THE DRAWINGS

Further advantages, features and details of the invention emerge from the following description of preferred exemplary embodiments and with reference to the drawing, in which:

FIG. 8 shows a plan view of parts of the drive for the apparatus according to FIG. 1.

DETAILED DESCRIPTION

An apparatus for cooling and/or warming articles (not specifically shown), such as pallets on which there are edible products from the confectionery sector, has two cylinders 1 and 2. These cylinders 1 and 2 are composed, for example, of a sheet-metal outer and have air openings 3, the appropriate air openings being indicated only on the cylinder 2. However, these openings appear to the same extent on cylinder 1 as well.

Figure 1:
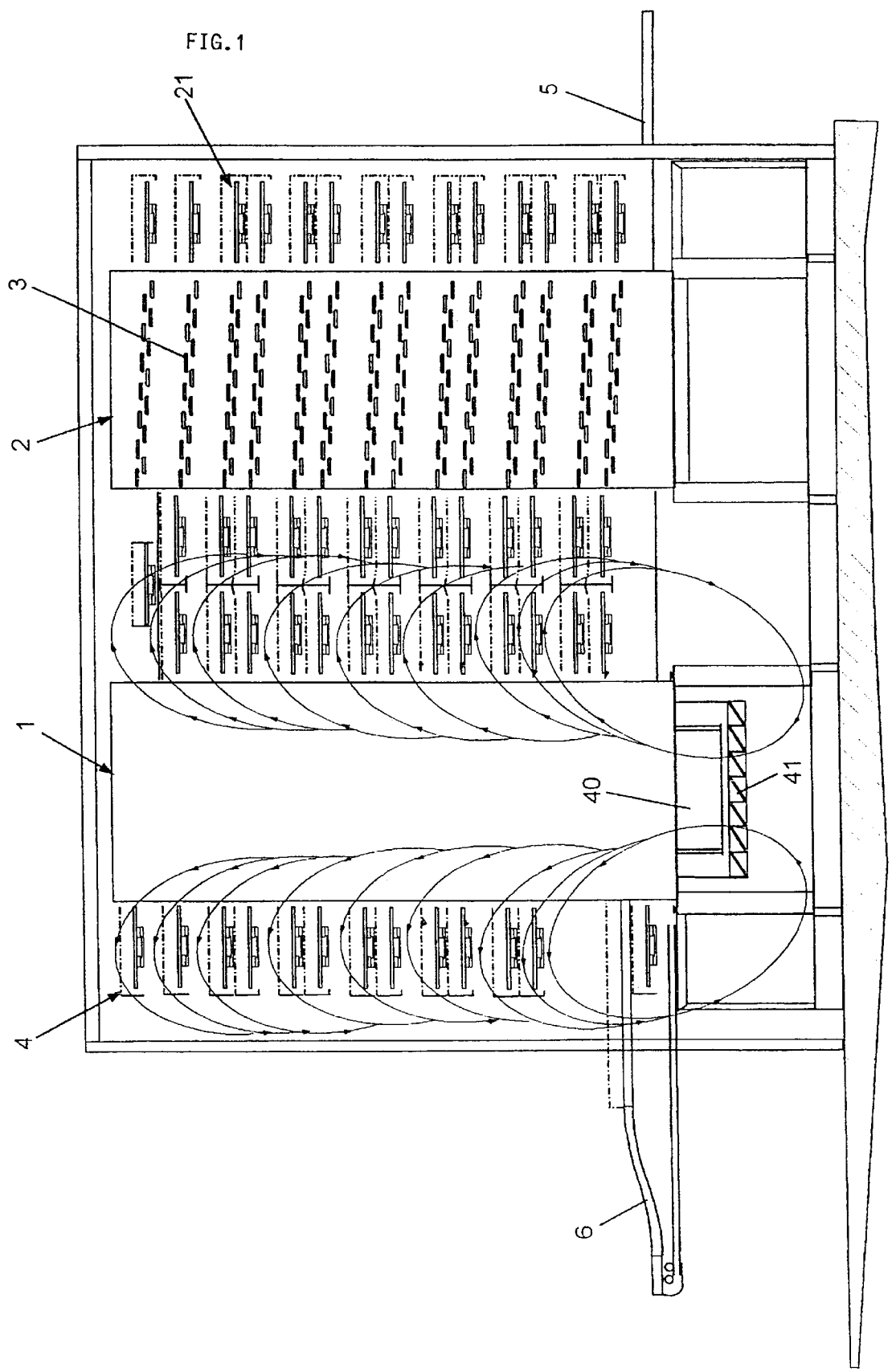
FIG. 1 shows a schematic side view of an apparatus according to the invention for cooling and/or warming articles.
Figure 2:
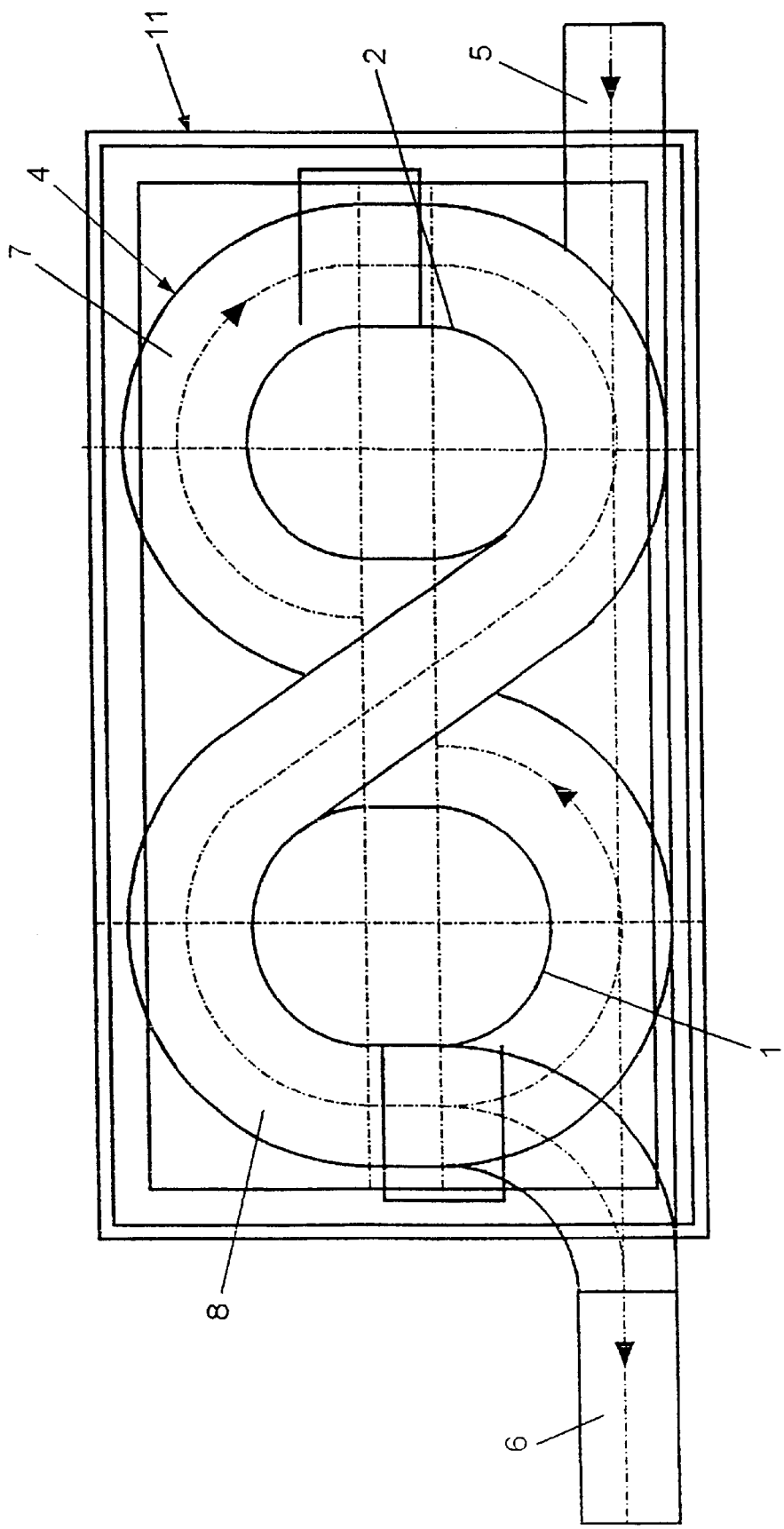
FIG. 2 shows a plan view of the apparatus according to FIG. 1.

The air openings 3 are arranged helically and offset in relation to one another, as can be seen in the case of cylinder 2. The pitch of the helical arrangement corresponds approximately to that of a helical conveyor 4, which can be seen better in FIG. 2. This helical conveyor 4 has an inlet 5 and an outlet 6. Between these, it wraps first around the cylinder 2 in helical paths 7 and 8, the helical paths 7 rising. After that, it wraps around the cylinder 1 in the opposite direction, the helical paths 8 falling. At the highest point of the helical conveyor 4 there is a straight reversal piece 9.

Figure 3:
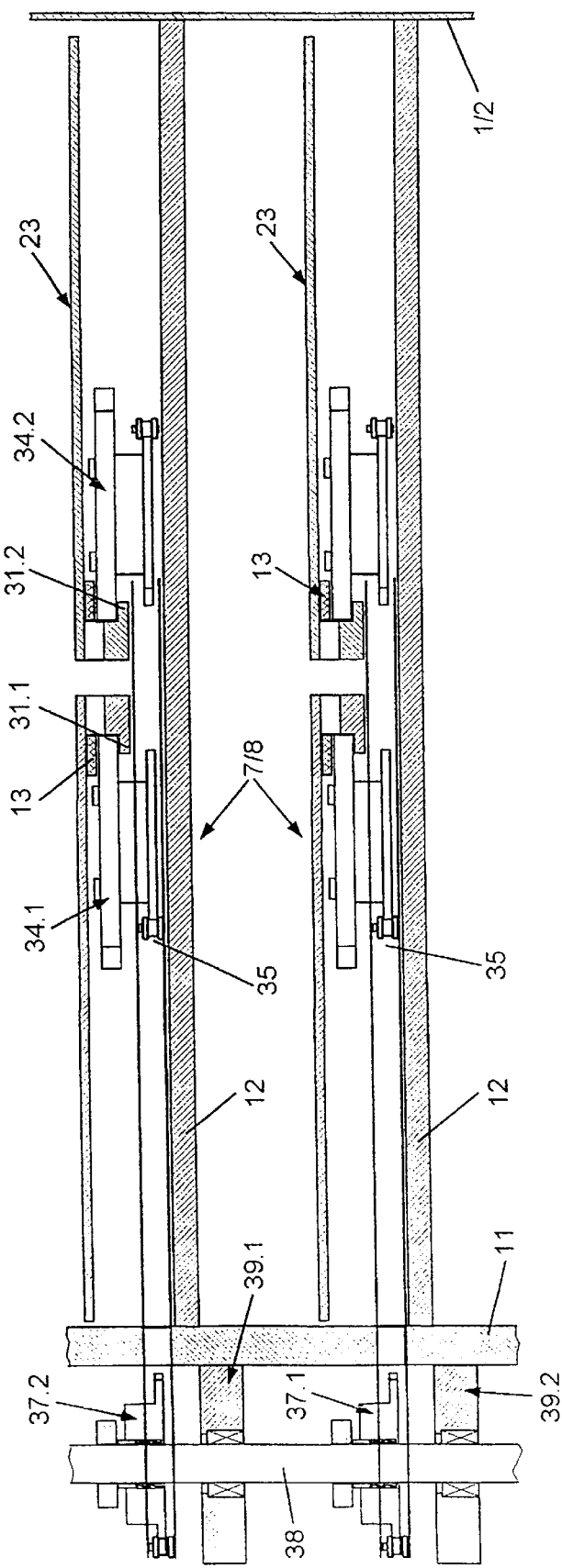
FIG. 3 shows a partial section through part of the apparatus according to FIG. 1.

FIG. 3 shows, in cross section, essentially two tracks 7/8 which belong to the helical conveyor 4 and are located one above another. On the inside, a portion of the cylinder 1/2 can be seen. On the outside, an outer wall is indicated as part of a machine frame 11. Between the outer wall and the cylinder 1/2 there are supporting arms 12, on which rail sections 13 of a guide track (not shown specifically) rest. The rail sections 13 are shown in more detail in FIG. 4, but only indicated in part in FIG. 3. They essentially comprise a sliding layer 14 and a supporting layer 15 in each case. Both are preferably manufactured from plastic, the sliding layer 14 being composed of a plastic which exhibits little wear, but permits chain links (described later) to slide.

The sliding layer 14 is divided into two and has a guide slot 16, in which the chain (described later) is guided. Together with the supporting layer 15, it forms an undercut groove 17, the undercut groove 17 having, in cross section, the shape of an inverted T.

Figure 4:
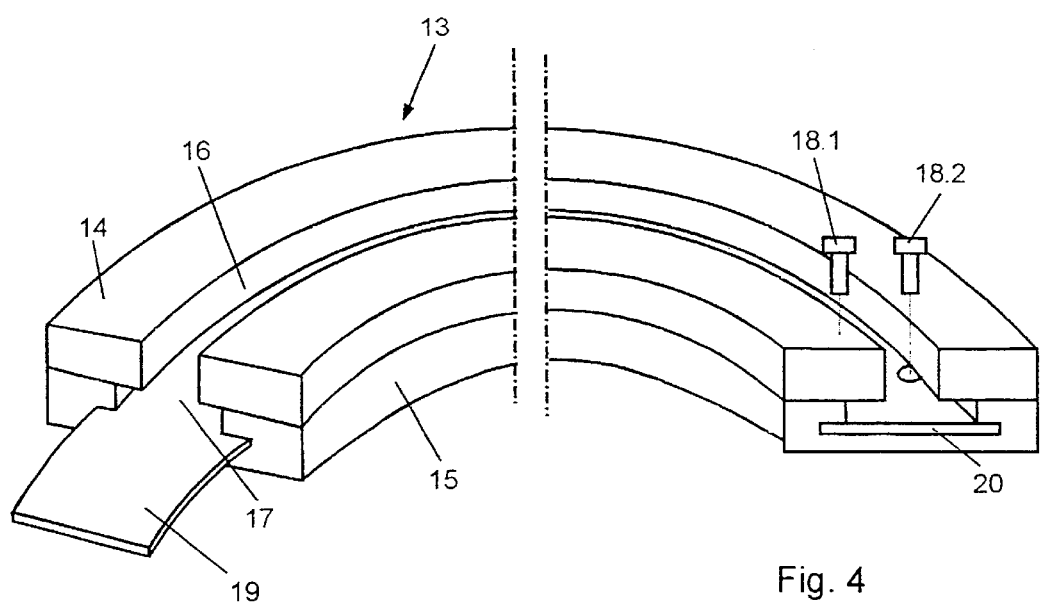
FIG. 4 shows a perspective illustration of part of a guide track.

In FIG. 4, two fastening bolts 18.1 and 18.2 are used to indicate the fact that the rail section 13 is fixed at one end. Fixing is carried out, for example, to a supporting arm 12. At the other end, a tongue 19 projects from the end face of the rail section 13, and, in the position of use, engages in an appropriately shaped recess 20 in the following rail section. This arrangement ensures that not only are fit inaccuracies accommodated, but that it is also possible to make allowance for any thermal expansion. In addition, length differences can be compensated for by smaller or greater pitches.

Figures 5, 6:
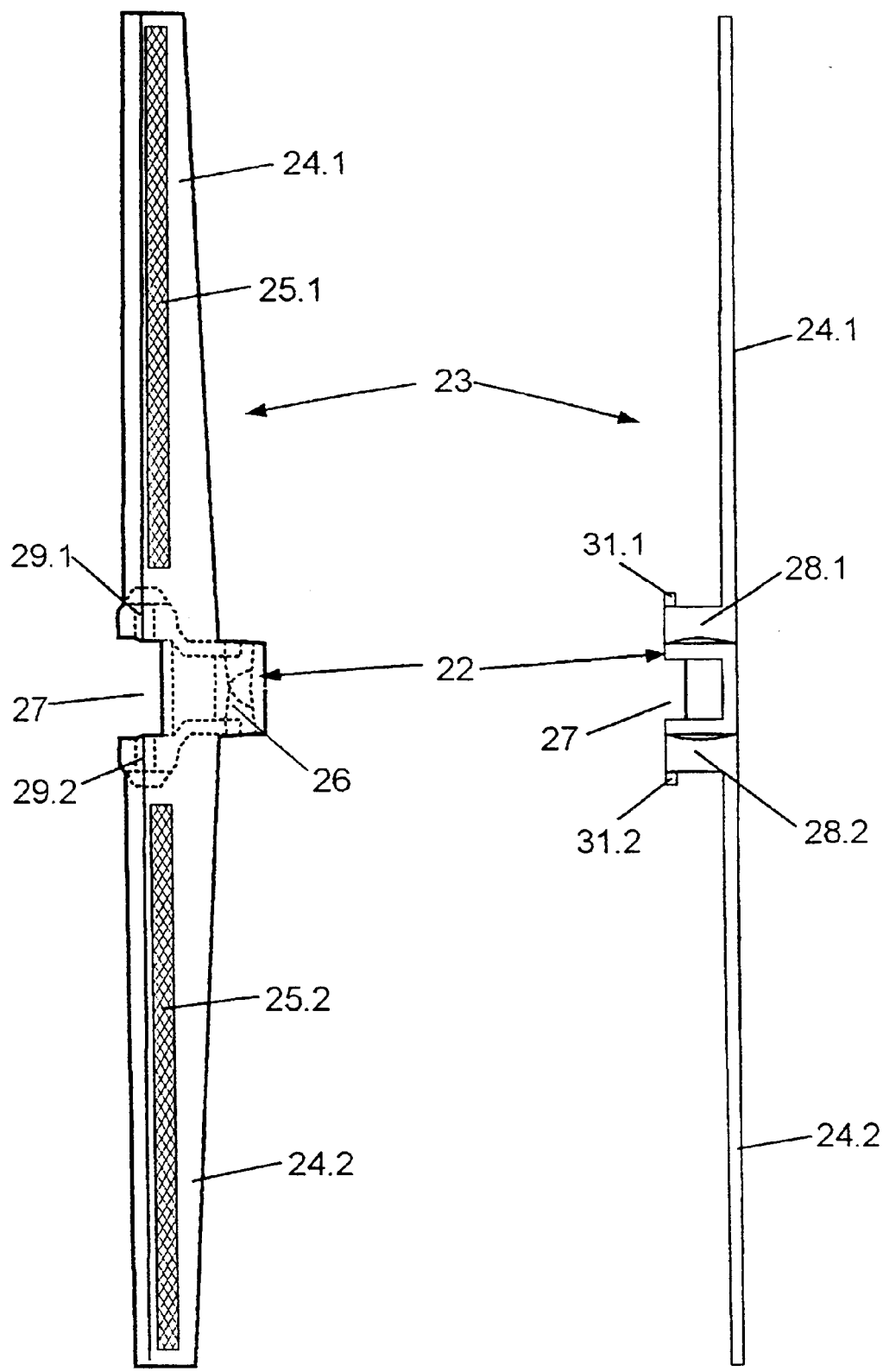
FIG. 5 shows a plan view of a chain link according to the invention.
FIG. 6 shows a side view of the chain link according to FIG. 5.

The aforementioned chain 21 comprises a large number of chain links 23 connected to one another via joints 22 (see FIGS. 5 and 6). Both sides of the joint 22 are adjoined in each case by a wing 24.1 and 24.2. In order to avoid the possibility that supported pallets will slip, in particular in the case of relatively great pitches, each wing 24.1 and 24.2 can be covered with an anti-slip strip 25.1 and 25.2, respectively. It is sufficient for this anti-slip strip 25.1 and 25.2 to be composed of a somewhat softer plastic.

Each joint 22 has a double tapered hole 26, which is arranged in a projection with which the chain link 23 engages in a recess 27 in a following chain link. This recess 27 is bounded at the sides by two bearing strips 28.1 and 28.2, through each of which a hole 29.1 and 29.2 passes. A bearing pin (not specifically shown) can be placed through the holes 29.1 and 29.2 and through the double tapered hole 26, and connects two chain links to each other. The double taper 26 ensures that the chain links 23 can also run around curves.

At the sides, approximately parallel to the wings 24.1 and 24.2, guide tabs 31.1 and 31.2 in each case project from the bearing strips 28.1 and 28.2. These guide tabs 31.1 and 31.2 can be seen better in FIG. 7. They engage over the respective bearing strip 28.1 and 28.2, which is illustrated only dashed in FIG. 7.

Figure 7:
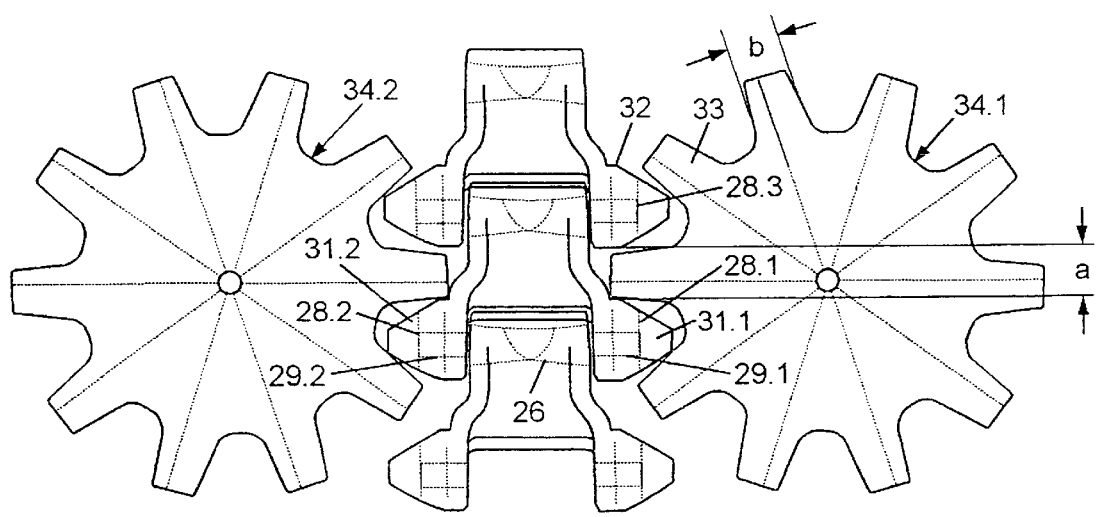
FIG. 7 shows a plan view of parts of the drive for a chain.

Each bearing strip 28.1 and 28.2 forms a rounded tooth flank 32 to be acted on by a tooth 33 of a drive gear wheel 34.1 and 34.2, respectively. When the chain is running straight ahead, as shown in FIG. 7, two successive bearing strips 28.1 and 28.3 have a distance a from each other which is greater than the width b of a tooth 33. By this means, it is possible for the chain 21 to be taken out of the engagement with the drive gear wheels 34.1 and 34.2. When running around a curve, however, the guide tabs 31.1 and 31.2 engage over the respective teeth 33 which are just acting on the tooth flanks 32. By this means, it is made impossible for the chain to jump out of its drive.

FIG. 8 also shows that the two drive gear wheels 34.1 and 34.2 are driven only by one drive chain 35. For this purpose, the drive chain 35 wraps around the drive gear wheels 34.1 and 34.2 in the manner shown, so that the drive gear wheels 34.1 and 34.2 can rotate in opposite directions.

In addition, the drive chain 35 is further assigned two gear mechanisms or tensioning wheels 36.1 and 36.2. The drive is provided via a drive wheel 37, which is located on the machine frame 11.

It can be seen from FIG. 3 that the drive wheels 37.1 and 37.2 of one level of the helical conveyor 4 are connected to each other via a drive rod 38 in each case. This drive rod 38 is an output shaft of a motor (not specifically shown). Between the individual drive wheels 37.1 and 37.2 there are still further bearing points 39.1 and 39.2.

The functioning of the present invention is as follows: For the purpose of cooling, for example, a pallet with edible products from the confectionery sector is put onto the helical conveyor 4 at the inlet 5. At the same time, fans 40 and cooling elements 41 in the cylinders 1 and 2 are set operating, as a result of which air is conveyed upward in the interior of the cylinder 1/2. Since each cylinder 1 and 2 is covered at the top, the cooling air escapes from the air openings 3 at the sides and there encounters the pallets, which are moved past the air openings 3. On the helical track 7 of the cylinder 2, the pallets are cooled first from one side and, on the helical track 8 of the cylinder 1, are cooled on the other side. Having been cooled, they pass to the outlet 6.

What is claimed is:

1. An apparatus for cooling and/or heating articles comprising:
   a housing having a conveyor inlet and a conveyor outlet;
   at least one cylinder disposed in the housing, the at least one cylinder defining an interior chamber and having at one end thereof provided with one of an air heating means and air cooling means and at the other end thereof closure means for closing the cylinder; and
   a conveyor for passing the articles through the housing and around the at least one cylinder from the conveyor inlet to the conveyor outlet, the conveyor being disposed along a helical path around the at least one cylinder wherein the at least one cylinder is provided with air flow openings feeding air from the interior chamber to the articles.

2. The apparatus as claimed in claim 1, wherein the plurality of air flow openings are arranged helically in the cylinder.

3. The apparatus as claimed in claim 1, including a first cylinder and a second cylinder spaced from the first cylinder wherein the helical conveyor wraps around the first cylinder in one direction and around the second cylinder in the opposite direction to the first cylinder.

4. The apparatus as claimed in claim 3, wherein the helical conveyor rises when wrapping around the first cylinder and falls when wrapping around the second cylinder.

5. The apparatus as claimed in claim 1, wherein, in the helical conveyor, a chain which is connected to a drive runs on a guide track.

6. The apparatus as claimed in claim 5, wherein the guide track includes two rail sections which comprise a supporting layer and a sliding layer.

7. The apparatus as claimed in claim 6, wherein each rail section is fixed at one end to a machine frame and, at the other end, engages with a tongue in a recess in the other rail section.

8. The apparatus as claimed in claim 6, wherein each rail section has an undercut T groove in which the chain runs.

9. The apparatus as claimed in claim 5, wherein the chain comprises a large number of chain links which are connected to one another by joints.

10. The apparatus as claimed in claim 9, wherein, at the side of the joints, a guide tab protrudes which is curved and at least partly covers a tooth of a drive wheel.

11. The apparatus as claimed in claim 10, wherein the chain is engaged by two mutually oppositely rotating drive gear wheels.

12. The apparatus as claimed in claim 11, wherein the two drive gear wheels are connected to each other by a common drive belt and a drive chain and are-driven by a drive means.

13. The apparatus as claimed in claim 12, wherein the drive means is connected to a motor via a common drive rod and a respective bevel gear mechanism.

* * * * *